United States Patent Office 2,859,185
Patented Nov. 4, 1958

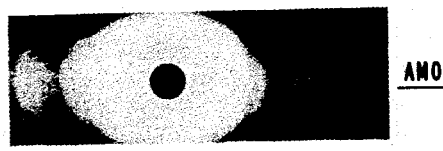
FIG.-1  AMORPHOUS ALUMINA
FIG.-2  COMMERCIAL CRYSTALLINE ALUMINA
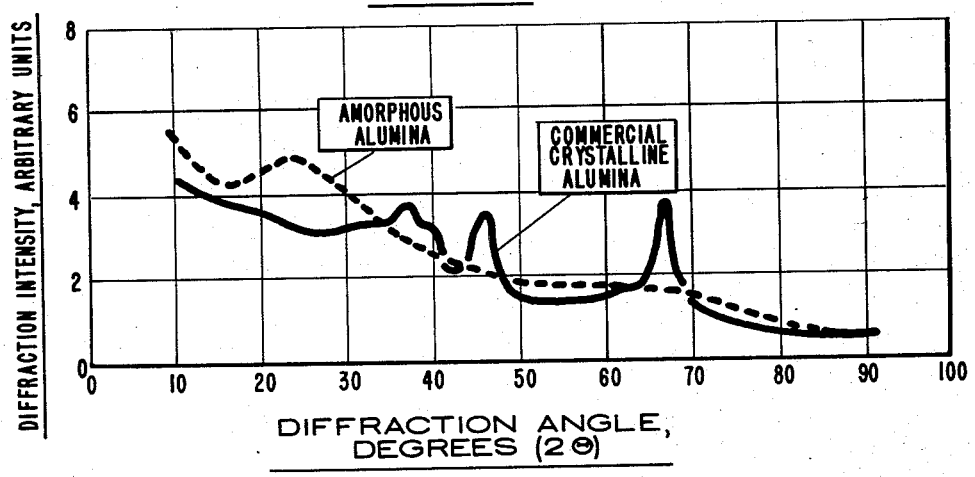
FIG.-3
CHARLES N. KIMBERLIN, JR. INVENTORS
ELROY M. GLADROW

2,859,185

REFORMING CATALYSTS

Charles N. Kimberlin, Jr., and Elroy M. Gladrow, Baton Rouge, La., assignors to Esso Research and Engineering Company, a corporation of Delaware Application July 28, 1953, Serial No. 370,795

14 Claims. (Cl. 252—465)

The present invention pertains to catalysts and particularly to the prepartion of catalysts and/or catalyst supports for use in the reforming or hydroforming of lower boiling hydrocarbons or naphta fractions into motor fuels of excellent anti-knock and engine cleanliness characteristics.

Hydroforming is a well known process for treating hydrocarbon fractions boiling within the motor fuel or naphtha range to upgrade the same or increase the aromaticity and improve the engine cleanliness and anti-knock characteristics of said fractions. It has been proposed to hydroform such lower boiling hydrocarbons by treating them in the presence of hydrogen or hydrogen-rich recycle gas (i. e. at relatively high hydrogen partial pressures) at temperatures of about 750–1050° F. and in contact with such catalysts as molybdenum oxide, chromium oxide or, in general, oxides and sulfides of metals of groups IV–VIII of the periodic system of elements, alone, or generally supported upon a base or spacing agent. Suitable materials for this purpose include activated alumina, alumina gel, zinc aluminate spinel or the like.

It is well known in several catalytic hydrocarbon conversions that catalysts having the same chemical composition but prepared in different ways may differ widely in their ability to promote certain reactions or hydrocarbon conversions. Previous experience with hydroforming catatlysts has shown that the catalyst base or support exerts a strong influence upon the ultimate behavior or activity of the catalyst.

Alumina is undoubtedly the most widely used support for hydroforming catalysts not only those containing molybdenum oxide or other group VI metal oxides as the active catalyst component but also those containing small amounts of platinum or palladium as the active component. Various methods have been proposed and utilized for the preparation of alumina catalyst supports such as reaction of an aluminum salt to give aluminum hydroxide or by ordinary hydrolysis of aluminum alcoholate or by heating or calcining alpha alumina trihydrate or beta alumina trihydrate. These methods always yield end products that are crystalline materials. The particular crystalline modification of the end product is dependent upon the source of the material and upon the particular heat treatment applied thereto. It has been reported in the literature (Industrial and Engineering Chemistry, vol. 42, page 1398 (1950)) there are four sequences of phase transitions and the phase changes that occur within a given sequence follow a definite order with increasing temperature of calcination. The initial alumina hydrate used as the raw material determines the particular sequence of phase transitions that that material passes through. Transfer from one sequence to another is difficult to achieve. The phase transitions within a sequence by heating for one hour in dry air at increasing temperatures are as follows:

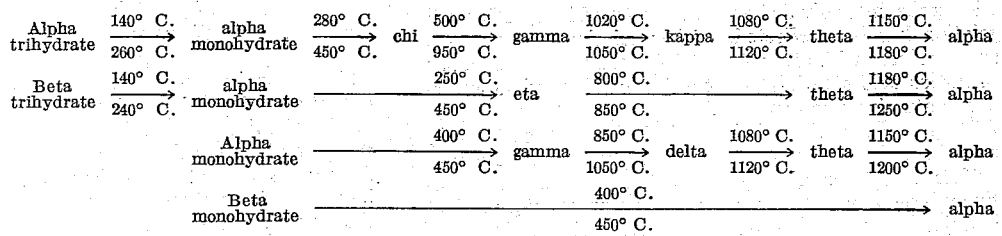

It is the object of this invention to prepare improved hydroforming catalysts.

It is also an object of this invention to prepare improved supports or carriers for various active catalytic substances.

It is a further object of this invention to prepare amorphous alumina of high stability for use as a catalyst support.

These and other objects will appear more clearly from the detailed specification and claims which follow.

It has now been found that hydrolysis of aluminum alcoholate in the presence of sulfur dioxide or of sulfurous acid yields a non-crystalline or amorphous form of alumina. This can be accomplished in several ways: (1) by passing sulfur dioxide through the aluminum alcoholate followed by hydrolysis with steam or ambient air, (2) hydrolyzing the aluminum alcoholate in wet alcohol containing dissolved sulfur dioxide, and (3) effecting hydrolysis of aluminum alcoholate with an aqueous solution of sulfurous acid. After hydrolysis, the alumina slurry is washed with water, or dilute solutions of ammonia or ammonium salts, or it may be blown with steam to substantially reduce the content of dissolved sulfur dioxide. The hydrolysis product is then dried in the conventional manner. Calcination of the dried material at 1200° F. for 6 hours gives a material which is essentially amorphous. An examination of the surface properties of this material shows a surface area of about 165 square meters per gram and a pore volume of about 0.40 cc. per gram. These values compare favorably with those for alumina made by hydrolyzing aluminum alcoholate in water alone, viz., 150 m.$^2$/g. surface area and 0.40 cc./g. pore volume. The latter material, however, is in the eta crystalline phase.

The amorphous character of the alumina produced in accordance with the present invention may be readily seen in the accompanying drawing in which Fig. 1 is an X-ray diffraction photograph of amorphous alumina produced in accordance with the present invention, Fig. 2 is an X-ray diffraction photograph of a commercial crystalline alumina, and Fig. 3 is an X-ray spectrometer tracing of the amorphous alumina of Fig. 1, shown as the dotted line and the X-ray spectrometer tracing for the commercial crystalline alumina of Fig. 2, shown as the continuous line.

In a preferred process for producing amorphous alumina in which the hydrolysis or aluminum alcoholate is effected with wet alcohol (2 to 20% water), the sulfur dioxide content of the hydrolysis medium is adjusted to maintain a concentration of about 2.0–3.0 grams of $SO_2$ per liter during the hydrolysis operation. The hydrolysis is conducted at nominally room temperature but because of the large amount of heat of reaction, cooling may be employed.

In the process for producing amorphous alumina involving hydrolyzing aluminum alcoholate in an aqueous sulfurous acid solution, the sulfur dioxide content of the hydrolysis medium should be about 6 grams of $SO_2$ per liter or more. Although the hydrolysis may be carried out over a wide temperature range, provided the $SO_2$ concentration is suitably maintained, room temperature or temperatures of about 65 to 95° F., are preferred.

Amorphous alumina can also be prepared in the form of spherical or microspheroidal particles by spraying the aluminum alcoholate into an atmosphere of $SO_2$ and maintaining the finely divided droplets dispersed in the $SO_2$ until gelation has been effected. After gelation, the droplets are contacted with alcohol containing water or an aqueous sulfurous acid solution to effect hydrolysis to yield amorphous alumina microspheres.

During the course of the hydrolysis some of the $SO_2$ may be oxidized by ambient air to $SO_3$, thus creating sulfate ion in solution. Because the presence of relatively large amounts of sulfate in a hydroforming catalyst is objectionable, oxidation of the sulfur dioxide by air is undesirable. The oxidation of $SO_2$ to $SO_3$ may be inhibited by excluding air or by adding small amounts (about one gram per liter of solution) of negative catalysts such as glycerol, mannitol, sugar, and other suitable polyhydric alcohols to the hydrolysis system.

Aluminas comprising a mixture of amorphous and crystalline forms result when an insufficient amount of sulfur dioxide is present in the hydrolysis medium. The relative amounts of crystalline and non-crystalline material depends on the $SO_2$ concentration level.

The amorphous alumina prepared as described above may be composited with the active catalytic component or components by impregnating the same with a solution of a heat decomposable compound of the active component such as ammonium molybdate, drying and calcining or finely divided $MoO_3$ or a heat decomposable compound of the active component can be dry mixed with the amorphous alumina and the resultant mixture heated or calcined to distribute and fix the active compound upon the base or support. The amount of molybdenum compound added should be sufficient to give a $MoO_3$ content of the finished catalyst of from about 5 to 15 wt. percent, preferably about 10 wt. percent. Other known hydroforming and/or aromatization catalysts such as chromium oxide, in amounts of 10 to 40 wt. percent, platinum in amounts of 0.05 to 2.0 wt. percent, or palladium 0.5 to 5.0 wt. percent can be incorporated on the amorphous alumina prepared in accordance with the present invention.

When preparing a platinum-alumina catalyst a platinum salt, such as platinum chloride, is dissolved in a non-aqueous medium such as any alcohol although n-butanol or "Pentasol" (mixed amyl alcohols) is preferred. Residual amounts of water in the alcoholic solution may be removed from the system by azeotropic distillation. The alcoholic solution of platinum chloride is mixed with the aluminum alcoholate solution in the proper amount to ultimately yield 0.05 to 2.0% Pt on $Al_2O_3$, preferably 0.3 to 1.0%. The next step involves the hydrolysis of the alcoholic aluminum alcoholate-platinum chloride solution in either (a) aqueous sulfurous acid, or (b) an alcohol containing water (up to about 20% by volume) and sulfur dioxide. Either hydrolysis medium yields a slurry of amorphous alumina containing the platinum in a highly dispersed form. Subsequent drying of the slurry and reduction of the platinum to metal by treatment with hydrogen at 750° to 1050° F. is accomplished by means well known in the art.

Further specifications of this invention are embodied in the several specific examples which follow.

*Example I*

A solution of aluminum alcoholate is prepared as follows. Fifty-four pounds of aluminum metal in the form of turnings are dissolved in about 124 gallons of a 50/50 mixture of mixed amyl alcohols and petroleum naphtha boiling in the range of about 200 to 300° F. About 1/10 ounce of mercuric chloride is used as a catalyst for the reaction between aluminum and the amyl alcohol. It is necessary to heat the mixture to start the reaction between the metal and the alcohol, but after the reaction is started, cooling is necessary. After the reaction is complete the solution of aluminum amylate is hydrolyzed by mixing with a solution of water in amyl alcohol.

The solution of water in amyl alcohol is made by adding 10 gallons of water to 60 gallons of amyl alcohol with stirring. Fifty gallons of the alcohol-rich layer, which comprises about 9 volume percent water, are withdrawn and placed in the hydrolysis vessel. Fifty gallons of the aluminum alcoholate solution are slowly added to the wet alcohol using constant stirring. An additional 50 gallons of water are then added to the slurry after hydrolysis is complete to separate the alcohol phase from the aqueous alumina slurry. The alcohol layer is withdrawn and the alumina slurry blown with steam to remove final traces of alcohol. The alumina slurry is dried in a steam heated oven at about 250° F. The dried alumina is converted into a hydroforming catalyst by impregnating with a solution of ammonium molybdate using about 1.35 pounds of ammonium molybdate dissolved in 3 quarts of water for each 10 pounds of alumina. After impregnation the catalyst is re-dried at about 250° F. and activated by heating for 6 hours at about 1200° F. This catalyst comprises about 10% molybdena and is designated catalyst "A."

*Example II*

Fifty-four pounds of aluminum metal are converted into aluminum alcoholate as described in Example I. The water saturated alcohol is also prepared as described above. Sulfur dioxide is bubbled through 50 gallons of the wet alcohol until the concentration of $SO_2$ is about 0.37 ounces per gallon. The aluminum alcoholate solution is added slowly to the $SO_2$-water-alcohol mixture using rapid agitation. During hydrolysis additional $SO_2$ is added to maintain the concentration. After hydrolysis is complete, about 50 gallons of water are added to the slurry to separate the alcohol phase from the aqueous alumina slurry. The alcohol layer is withdrawn and the alumina slurry is blown with steam to remove any sulfur dioxide residues and final traces of alcohol. The alumina slurry is dried in a steam heated oven at about 250° F. The dried amorphous alumina is converted into a hydroforming catalyst by impregnating with a solution of ammonium molybdate using about 1.35 pounds of ammonium molybdate dissolved in 3 quarts of water for each 10 pounds of alumina. After impregnation, the catalyst is re-dried at about 250° F. and activated by heating for 6 hours at 1200° F. This catalyst comprises about 10% molybdena and is designated catalyst "B."

Example III

Catalysts "A" and "B" described in Examples I and II are employed in the form of 3/16 inch x 3/16 inch cylindrical pellets in a fixed catalyst bed operation for the hydroforming of a 200° F. to 330° F. boiling range virgin naphtha from mixed southeast and west Texas crudes. The aniline point of this naphtha is 126° F. The conditions employed are 900° F. temperature, 200 p. s. i. g. pressure, using 1500 cubic feet of feed hydrogen per barrel of naphtha feed, and a naphtha feed rate of approximately one volume of naphtha per volume of catalyst per hour; slight adjustments are made in the feed rate in order to obtain a $C_6+$ product with each catalyst having an aniline point of 0° F. The yields of gas and $C_6+$ products are shown in the tabulation below.

| Catalyst | "A" | "B" |
|---|---|---|
| Crystal Phase of $Al_2O_3$ Base | Eta | Amorphous. |
| Aniline Point of $C_6+$ Product, °F | 0 | 0. |
| Yield of $C_6+$ Product, Vol. percent | 65 | 67. |
| Yield of Gas, Wt. percent | 16 | 15. |

Example IV

Aluminum alcoholate is prepared as described in Example I. Twenty-five gallons of water are charged to the hydrolysis vessel and sulfur dioxide added until the concentration of $SO_2$ is about 1.2 ounces per gallon of water. Twelve gallons of aluminum alcoholate are then added slowly to the aqueous sulfurous acid solution using rapid mixing to effect hydrolysis. The organic layer is withdrawn and residual amounts of alcohol and hydrocarbon are removed by blowing with steam. The aqueous slurry of amorphous alumina is treated batchwise with 17 pounds of hydroxyl form regenerated Amberlite IRA–400 anion exchange resin. Amberlite IRA–400 is a commercial anion exchange resin supplied by the Rohm and Haas Company of Philadelphia; this material is a strongly basic resin, believed to be based on polystyrene and containing quaternary ammonium groups. It is supplied in the form of the chloride salt and is converted to the hydroxyl form by treating with 5% sodium hydroxide solution. About 5 volumes of this sodium hydroxide solution are used to convert 1 volume of wet resin to the hydroxyl form. After treatment with caustic the resin is washed with water to free it of soda. Other anion exchange resins may be used. After mixing the resin and slurry, the mixture is passed through a 40 mesh screen to separate the alumina slurry from the coarse resin particles. The alumina slurry is oven dried at 250° F. in the conventional manner. The dried amorphous alumina is converted into a hydroforming catalyst by impregnating with a solution of chloroplatinic acid using about 12.5 grams of platinum chloride (40% Pt) dissolved in about 0.8 liters of water for each kilogram of alumina. After impregnation this catalyst is redried at about 250° F. This catalyst comprises about 0.5% platinum.

A portion of the above platinum on amorphous alumina catalyst is heated for 64 hours at 1250° F. in air. An X-ray examination of the cooled material shows the alumina base to be still amorphous and, moreover, the average platinum crystal size is seen to be much less than 100 angstroms, showing the stabilizing action of amorphous $Al_2O_3$ toward platinum crystal growth.

A portion of this catalyst is employed in the form of 3/16 inch x 3/16 inch cylindrical pellets in a fixed bed hydroforming operation for the hydroforming of a 200° F. to 330° F. boiling range virgin naphtha having a gravity of 54.4° API and a Research octane number of 58 (clear). The conditions employed are 925° F. bath temperature, 200 p. s. i. g. pressure, using about 6000 cubic feet of feed hydrogen per barrel of naphtha feed. The product from the hydroforming operation comprises a yield of about 90.5 volume percent $C_5+$ gasoline having an octane number of 85 (Research clear).

Catalysts prepared upon amorphous alumina supports in accordance with the present invention can be used for reforming or hydroforming hydrocarbon feed stocks in fixed bed, moving bed or fluidized solid type operations. The feed or charging stock may be a virgin naphtha, a cracked naphtha, a Fischer-Tropsch naphtha or the like, having a boiling range of from about 125 to 430° F., or it may be a narrow boiling cut from within this range. The feed stock is preheated alone, or, if desired, in admixture with hydrogen-rich gas to reaction temperature or to the maximum temperature possible while avoiding thermal degradation of the feed stock. Ordinarily, preheating of the feed stock is carried out to temperatures of about 800–1050 F., preferably about 975° F. Thermal degradation at preheat temperatures can be avoided or minimized by limiting the time of residence of the feed stock in the preheat coils, transfer and feed inlet lines.

Hydrogen-rich gas, preferably process or recycle gas containing from 40 to 70 or more volume percent hydrogen is circulated through the reaction zone at a rate of from about 1000 to 8000 cu. ft. per barrel of naphtha feed. The recycle gas is preheated to temperatures of about 1100–1200° F., preferably about 1185° F. before introduction into the reaction zone. The amount of recycle gas circulated is preferably the minimum amount that will suffice to carry the necessary heat of reaction into the reaction zone and keep carbon formation at a satisfactory low level.

The reaction zone is maintained at a temperature between about 875 and 1500° F., preferably about 925° F. and at pressures between about 50 and 500 lbs. per sq. inch, preferably about 200 lbs. per sq. inch. Regeneration of the catalyst is effected by burning off carbonaceous deposits with air or oxygen-containing gas at temperatures of about 1100–1200° F., ordinarily at essentially the same pressure as is maintained in the reaction zone or vessel. In fluidized solids systems, the average residence time of the catalyst particles in the reaction zone is from about 2 to 4 hours while the average residence time of the catalyst particles in the regenerator is of the order of from about 3 to 15 minutes.

The weight ratio of catalyst to oil introduced into the reactor should be about 0.5 to 1.5, preferably about 1.0. Space velocity or weight in pounds of feed charged per hour per pound of catalyst in the reactor depends upon the age or activity level of the catalyst, the character of the feed stock and the desired octane number of the product. Space velocity may vary, for example, from about 1.5 wt./hr./wt. to about 0.15 wt./hr./wt.

The foregoing description contains a limited number of embodiments of the present invention. It will be understood, however, that numerous variations are possible without departing from the spirit or scope of this invention.

What is claimed is:

1. A method of preparing improved catalyst supports which comprises hydrolyzing an aluminum alcoholate in the presence of sulfur dioxide to form amorphous alumina, drying and calcining said amorphous alumina.

2. A method of preparing improved catalyst supports which comprises contacting aluminum alcoholate with sulfur dioxide to cause gelation of the alcoholate, hydrolyzing the sulfur dioxide-containing alcoholate to form amorphous alumina, drying and calcining said amorphous alumina.

3. A method of preparing improved catalyst supports which comprises hydrolyzing an aluminum alcoholate in the presence of alcohol containing a minor proportion of water and sulfur dioxide to form amorphous alumina, drying and calcining said amorphous alumina.

4. A method of preparing improved catalyst supports which comprises hydrolyzing an aluminum alcoholate in an aqueous solution of sulfurous acid to form amorphous alumina, drying and calcining the amorphous alumina.

5. A method of preparing improved catalyst supports which comprises hydrolyzing an aluminum alcoholate in an aqueous solution of sulfurous acid containing a compound selected from the group consisting of glycerol, mannitol and sugar inhibiting the oxidation of $SO_2$ to $SO_3$, drying and calcining the amorphous alumina.

6. A method of preparing active reforming catalyst compositions which comprises hydrolyzing an aluminum alcoholate in the presence of sulfur dioxide to form amorphous alumina, heating said amorphous alumina to remove water therefrom, depositing an active reforming catalyst selected from the group consisting of platinum metals and group VI metal compounds on said amorphous alumina and activating the resultant composition.

7. A method of preparing active reforming catalyst compositions which comprises contacting aluminum alcoholate with sulfur dioxide to cause gelation of the alcoholate, hydrolyzing the sulfur dioxide-containing alcoholate to form amorphous alumina, heating said amorphous alumina to remove water therefrom, depositing an active reforming catalyst selected from the group consisting of platinum metals and group VI metal compounds on said amorphous alumina and activating the resultant composition.

8. A method of preparing active reforming catalyst compositions which comprises hydrolyzing an aluminum alcoholate in the presence of alcohol containing a minor proportion of water and sulfur dioxide to form amorphous alumina, heating said amorphous alumina to remove water therefrom, depositing an active reforming catalyst selected from the group consisting of platinum metals and group VI metal compounds on said amorphous alumina and activating the resultant composition.

9. A method of preparing active reforming catalyst compositions which comprises hydrolyzing an aluminum alcoholate in an aqueous solution of sulfurous acid to form amorphous alumina, heating said amorphous alumina to remove water therefrom, depositing an active reforming catalyst selected from the group consisting of platinum metals and group VI metal compounds on said amorphous alumina and activating the resultant composition.

10. A method of preparing active reforming catalyst compositions which comprises hydrolyzing an aluminum alcoholate in an aqueous solution of sulfurous acid containing a compound selected from the group consisting of glycerol, mannitol and sugar inhibiting the oxidation of $SO_2$ to $SO_3$ to form amorphous alumina, heating said amorphous alumina to remove water therefrom, depositing an active reforming catalyst selected from the group consisting of platinum metals and group VI metal compounds on said amorphous alumina and activating the resultant composition.

11. The process as defined in claim 6 wherein the active reforming catalyst is a group VI metal compound.

12. The process as defined in claim 6 wherein the active reforming catalyst is 5.0 to 15 wt. percent molybdenum oxide.

13. The process as defined in claim 6 wherein the active reforming catalyst is a platinum metal.

14. The process as defined in claim 6 wherein the active reforming catalyst is 0.05 to 2.0 wt. percent platinum.

References Cited in the file of this patent

UNITED STATES PATENTS

| | | |
|---|---|---|
| 2,331,292 | Archibald et al. | Oct. 12, 1943 |
| 2,479,109 | Haensel | Aug. 16, 1949 |
| 2,636,865 | Kimberlin | Apr. 28, 1953 |

FOREIGN PATENTS

| | | |
|---|---|---|
| 498,510 | Great Britain | Jan. 2, 1939 |
| 667,145 | Great Britain | Feb. 27, 1952 |